J. C. THEBERATH.
VEHICLE WHEEL RIM.
APPLICATION FILED DEC. 3, 1917.

1,401,015.

Patented Dec. 20, 1921.

INVENTOR
Joseph C. Theberath.
By Fay, Oberlin & Fay
ATTORNEYS.

UNITED STATES PATENT OFFICE.

JOSEPH C. THEBERATH, OF CLEVELAND, OHIO, ASSIGNOR TO THE STANDARD PARTS COMPANY, OF CLEVELAND, OHIO, A CORPORATION OF OHIO.

VEHICLE-WHEEL RIM.

1,401,015.     Specification of Letters Patent.     Patented Dec. 20, 1921.

Application filed December 3, 1917. Serial No. 205,026.

*To all whom it may concern:*

Be it known that I, JOSEPH C. THEBERATH, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements, relating as indicated to a vehicle wheel rim, have more particular regard to so-called Q. D. or quick detachable rims for pneumatic tires, such as are largely used in connection with automobiles. This trade-name is somewhat of a misnomer, for the rim itself is not actually detachable at all, but merely has a side flange which may be detached in order to facilitate the placing on and removal of a tire from the rim. The object of the present invention is to provide improved locking means for securing such detachable side flange in place on the rim, and to the accomplishment of such object the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
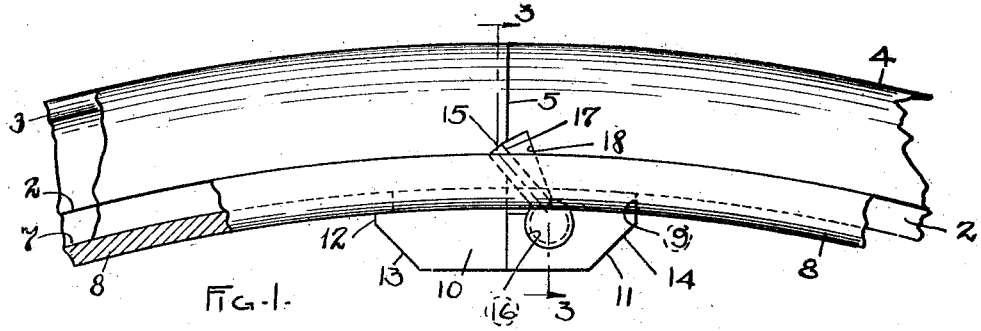
Figure 2:
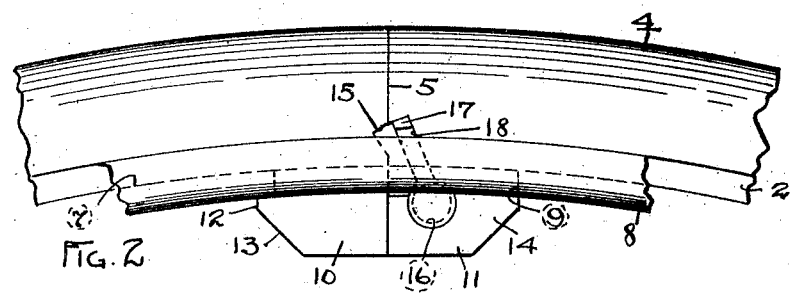
Figure 3:
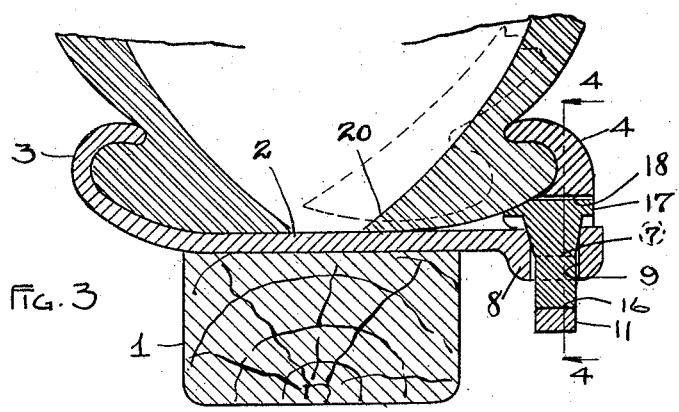
Figure 4:
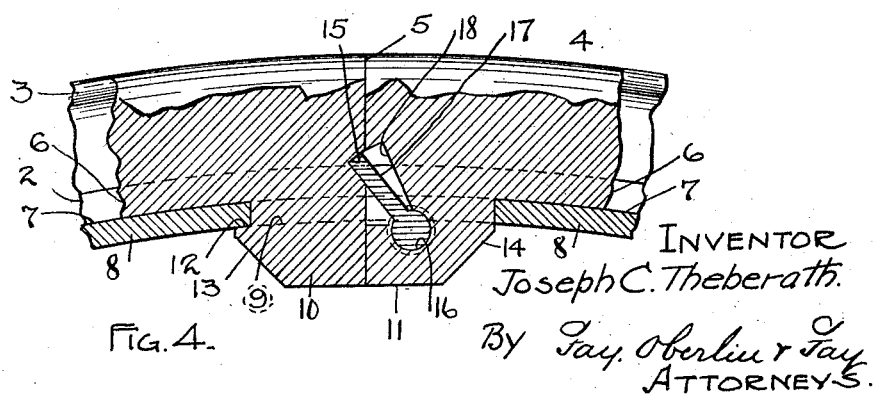

Figure 1 is a side elevational view of the so-called quick detachable rim showing my improved locking device incorporated therein; Fig. 2 is a view similar to Fig. 1 but showing the locking device in inoperative position; Fig. 3 is a transverse section of the same taken on the plane indicated by the line 3—3, Fig. 1; and Fig. 4 is a section of a detail taken on a plane parallel with the plane of the wheel, as indicated by the line 4—4, Fig. 3.

The construction of the wheel body, of which a portion of the felly 1 only is shown in the aforesaid drawing, is a matter of indifference so far as the present invention is concerned, it being for this reason that only such felly is illustrated. The rim 2, shown as of the plain clencher type, is directly mounted on such wheel body, and, as illustrated, is generally provided with an integral tire retaining flange 3, along its one edge, namely, the edge which is disposed toward the body of the vehicle, although if desired a separable, reversible flange may be substituted, as will be readily understood.

It is to the other flange 4 and the locking means provided in connection therewith, that attention is more especially directed in the present connection. Such flange, as usual, in order that it may be detachably secured to the rim, is transversely split at one point, as at 5, in its circumference and has its inner edge 6 formed to seat in an encircling groove or depression 7 adjacent the corresponding edge of the rim. A corresponding bead 8 is of course formed on the underside of the rim adjacent this edge, and at a point adjacent to the meeting ends of the split side-flange the bottom wall of such groove or bead is cut away so as to provide an elongated slot 9, through which may project two complementary lugs 10 and 11, formed on the inner edges of such flange ends, respectively. These lugs, as shown in Figs. 1 and 2, are adapted to project radially through such slot, and the one 10 thereof is undercut or recessed so as to provide a toe 12, which interlocks, when the flange is in place, with the adjacent edge of the slot. Moreover, both such lugs have their opposite faces 13 and 14, respectively, beveled so as to facilitate their insertion in the slot.

Of the meeting faces of the flange ends, the one on the end which is provided with such undercut lug 10, is formed with a transversely extending angular notch 15, while the face of the other end is recessed and provided with a transverse circular bearing 16, in which is oscillatorily held a key 17. The portion of the latter that is fitted in such circular bearing is laterally upset so as to prevent dislodgement of the key while still leaving it free to be oscillated within the limits of the recess 18. The latter is of such extent and form as to permit the key in one position, that shown in Fig. 2, to lie wholly within the plane of the face of the corresponding flange end, while in another position, as shown in Fig. 1, the outer end of the key may be swung into engagement with the angular notch in the face of the opposite flange end.

When in such last-named position the aforesaid key will obviously prevent the removal of the flange-end to which it is attached, the other flange-end being directly interlocked with the bottom of the groove. Accordingly, the device in question serves to securely lock the flange as a whole in its seated position on the rim. However, by simply turning the key into the position shown in Fig. 2, there is nothing to prevent the corresponding flange-end from being pried out of such groove, and thereupon by a slight circumferential displacement of the flange, its other end is unhooked from engagement with the bottom of the groove and the entire flange may be removed.

The key 17, it will be observed, is securely held in its operative, or locking position, by the engagement of the bead 20 of the tire-shoe therewith, as shown in Fig. 3. In other words, such key cannot be swung into the inoperative position of Fig. 2, until the said bead has been pushed inwardly into the position as shown in dotted outline.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a split side-flange removably mounted on said rim, one end of said flange being adapted to radially interlock with said rim and having an angular recess in its transverse face; and a member movably attached to the other flange-end adapted in one position to engage such recess and thereby radially lock such second flange-end to the first.

2. The combination with a wheel rim formed with a slot; of a split side-flange removably mounted on said rim, said flange laterally interlocking with said rim when in place thereon and having a lug adjacent its one end adapted to radially interlock with such slot in said rim and also having an angular recess in the transverse face of such end; and a movable member in the other flange-end adapted in one position to engage such recess and thereby radially lock such second flange-end to the first.

3. The combination with a wheel rim formed with a slot; of a split side-flange removably mounted on said rim, said flange laterally interlocking with said rim when in place thereon and having a lug adjacent its one end adapted to radially interlock with such slot in said rim and also having an angular recess in the transverse face of such end; and a key mounted in the other flange-end so as to be oscillatory about a transverse axis, said key being adapted in one position to engage such recess and thereby radially lock such second flange-end to the first.

4. The combination with a wheel rim; of a split side-flange removably mounted on said rim, one end of said flange being adapted to radially interlock with said rim; and a movable member on the other flange-end adapted in one position to radially interlock the latter with said first flange-end, the tire, when in place in said rim, being adapted to retain said member in such locking position.

5. The combination with a wheel rim formed with a slot; of a split side-flange removably mounted on said rim, said flange laterally interlocking with said rim when in place thereon and having a lug adjacent its one end adapted to radially interlock with such slot in said rim and also having an angular recess in the transverse face of such end; and a key mounted in the other flange-end so as to be oscillatory about a transverse axis, said key being adapted in one position to engage such recess and thereby radially lock such second flange-end to the first, the adjacent bead of the tire-shoe, when the tire is in place on said rim, being adapted to engage said key and retain the same in such locking position.

Signed by me this 24 day of November, 1917.

JOSEPH C. THEBERATH.

Attested by—
A. S. Eves,
K. B. Keyerleber.